United States Patent [19]

Datta-Barua

[11] 4,281,553

[45] Aug. 4, 1981

[54] VORTEX SHEDDING FLOWMETER

[76] Inventor: Lohit Datta-Barua, 5210 Straight Arrow, Humble, Tex. 77338

[21] Appl. No.: 902,677

[22] Filed: May 4, 1978

[51] Int. Cl.³ .............................................. G01F 1/32
[52] U.S. Cl. ................................... 73/861.24; 73/189
[58] Field of Search .............. 73/189, 194 VS, 861.22, 73/861.23, 861.24

[56] References Cited

U.S. PATENT DOCUMENTS

| | | | |
|---|---|---|---|
| 1,215,135 | 2/1917 | Fisher | 73/194 |
| 1,935,445 | 11/1933 | Heinz | 73/194 |
| 2,809,520 | 10/1957 | Richard, Jr. | 73/194 |
| 2,813,424 | 11/1957 | Liebmann | 73/194 |
| 3,552,204 | 1/1971 | Tourmen | 73/189 |
| 3,680,375 | 8/1972 | Joy et al. | 73/194 |
| 3,693,438 | 9/1972 | Yamasaki et al. | 73/194 |
| 3,720,104 | 3/1973 | Zanker | 73/194 |
| 3,867,839 | 2/1975 | Herzl | 73/194 |
| 3,878,714 | 4/1975 | Protta et al. | 73/189 |
| 3,878,715 | 4/1975 | Kobayashi | 73/194 |
| 3,878,716 | 4/1975 | Asada | 73/194 |
| 3,888,120 | 6/1975 | Burgess | 73/194 |
| 3,927,566 | 12/1975 | Zanker | 73/194 |
| 3,948,097 | 4/1976 | Kurita et al. | 73/194 |
| 3,979,954 | 9/1976 | Ide et al. | 73/194 |
| 4,033,188 | 7/1977 | Herzl | 73/194 |
| 4,069,708 | 1/1978 | Fussell, Jr. | 73/194 |
| 4,122,712 | 11/1977 | Thomas | 73/194 |
| 4,171,643 | 10/1979 | Frick | 73/194 |

FOREIGN PATENT DOCUMENTS 52-132866  11/1977  Japan .......................................... 73/194

OTHER PUBLICATIONS

Yamasaki et al, "The Karman Vortex Flowmeter", in J. Soc. Inst. Cont. Eng., (Japan), vol. 10, #3, 3/71, pp. 173-180.

*Primary Examiner*—Herbert Goldstein
*Attorney, Agent, or Firm*—Bard & Groves

[57] ABSTRACT

A vortex shedding flowmeter is provided with a unitary obstacle element for shedding vortices and response element reacting to forces produced by the shedding vortices. A cylindrical element may be used for omnidirectional measurement capability, with a pair of strain gauge bridges arranged in quadrature to provide a linearly variable frequency output proportional to flow velocity. Electronic circuitry transforms the frequency signal to an analog amplitude signal proportional to flow velocity. Sample and hold circuitry maintains a stable output under transient loss-of-input signal conditions.

18 Claims, 6 Drawing Figures

VORTEX SHEDDING FLOWMETER

BACKGROUND OF THE INVENTION

This invention relates generally to flow meters of the vortex-shedding type, and more particularly, to a vortex-shedding device for measuring omni-directional flow.

An obstacle placed in a moving fluid will, over a selected range of fluid velocities, produce two periodic streams of vortices or eddies in the wake of the obstacle. These regular vortex patterns are referred to as Karman Vortex Streets. For a well-known range of Reynolds numbers, the frequency at which the vortices are shed is linearly related to the flow rate of the fluid stream.

Description of the Prior Art

It is well known in the art to make use of the Karman vortex street to provide a measure of fluid flow rate. A first set of such flow meters detects the presence of the vortices after they have left the obstacle. U.S. Pat. No. 3,680,375 to Joy et al teaches the use of ultrasonics to detect the presence of the periodic vortices. U.S. Pat. No. 3,693,438 to Yamasaki et al teaches the use of electrically heated wires and ultrasonics as means for detecting the presence of vortices.

The Yamasaki et al patent and U.S. Pat. No. 3,948,097 to Kurita et al further teach that the alternately shedding vortices may be used to generate a cross flow if a duct is placed through the vortex generating obstacle and generally perpendicular to the direction of fluid flow. This periodic flow may be used in combination with a detector to provide vortex frequency information. U.S. Pat. No. 3,878,715 to Kobayashi detects the presence of vortices in a gap downstream of the vortex shedder, using vortex-induced flow in the gap to modulate an electromagnetic field. U.S. Pat. Nos. 3,867,839 to Herzl; 3,888,120 to Burgess; and 4,033,188 to Herzl all teach introducing a rigid obstacle assembly in a fluid stream and detecting the periodic vortices shed by the obstacle. In each of the patents, a tail section is provided behind the vortex shedder and is cantilevered from the vortex shedder. The shed vortices cause the cantilevered section to vibrate at a rate corresponding to the vortex shedding rate. These vibrations may be sensed by strain gauges and the resulting signal processed to obtain an indication of flow rate.

In each of the above-mentioned references, the vortex shedder is rigidly mounted and does not respond to the shedding vortices. In U.S. Pat. No. 3,720,104 to Zanker, a cylindrical vortex shedder is provided which is flexibly mounted to obtain large scale deflections in response to the asymmetric forces produced by the shedding vortices. Zanker specifically teaches that a bodily deflection is required to obtain a coherent vortex pattern to produce a usable signal. Zanker teaches detection of this bodily movement by means of an acousto-electric transducer, strain gauges on elements perpendicular to the cylinder and mounting the cylinder within the conduit and modulating an electro-magnetic field. The device taught by Zanker requires a specific orientation to a fluid stream and contemplates relatively large movements of the mobile vortex shedder.

U.S. Pat. No. 4,052,895 to Herzl et al represents yet another embodiment showing a fixed vortex generator with a vane section to obtain a large mechanical deflection which is mechanically transmitted to a point outside of the flow conduit.

It may be seen from each of the above references that a generally uni-directional flow is required to obtain an output from the instrument. Thus, the instrument is generally usable only in a conduit or with auxiliary equipment for orienting the flow meter in the direction of the incoming flow. In addition, each of these devices requires substantial apparatus not connected with the vortex shedder for detecting the frequency of the vortices.

It will be apparent that the above references also contemplate a fixed mounting within a conduit such that the obstacle remains permanently within the conduit. Replacement of the flow meter would, thus, generally be an involved operation. An easily replacable unitary device for producing the vortex street and directly responding to the vortices would appear to be desirable.

The disadvantages of the prior art are overcome by the present invention, however, and improved apparatus and methods are provided for using shedding vortices to obtain an output signal functionally related to a fluid flow rate.

SUMMARY OF THE INVENTION

In a preferred embodiment of the present invention, an elongated element having one fixed end and one free end is provided. In cross-section, the element has at least one axis of symmetry whereby vortices shedding from the element are produced when the free end is introduced into a moving fluid with an axis of symmetry generally aligned with the direction of fluid movement. An elongated cylinder may be provided to obtain an omni-directional alignment.

Periodic asymmetric forces across the axis of symmetry are produced by the shedding vortices. Strains are thus produced in the elongated element and may be detected near the fixed end of the element. Strain gauges may be fixed to the element to detect these strains and provide an output signal for processing. Where an elongated cylinder is provided, a plurality of strain gauges may be arranged to obtain an output signal irrespective of flow direction.

Strain gauge output signal processing circuitry is provided to obtain an output signal functionally related to the rate of flow. Where changing flow conditions are expected, circuitry may be provided to sample incoming signals and hold the output signal during conditions of zero signal amplitude and until a subsequent incoming signal is received.

Accordingly, it is a feature of the present invention to provide a flow meter having a unitary vortex shedder and response element.

Another feature is a vortex shedding flow meter with an omni-directional response capability.

Yet another feature is a vortex shedding flow meter having a stable output signal during rapid signal amplitude fluctuations.

An advantage of the present invention is a flow meter providing a low interference to fluid flow.

Yet another advantage is a vortex shedding flow meter which can be easily installed in, or removed from, a conduit.

One other advantage is a rugged flow meter capable of measuring the flow of ocean currents.

One other advantage is the elimination of moving parts or parts with large scale deflections which are hindered by adjacent obstacles.

These and other features and advantages of the present invention will become apparent from the following detailed description, wherein reference is made to the figures in the accompanying drawings.

In the Drawings

DETAILED DESCRIPTION

Theory

Figure 1:
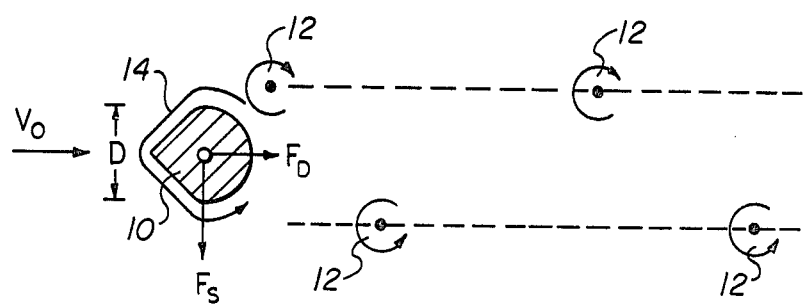
FIG. 1 is a schematic illustration of vortex shedding-induced forces on a probe element.

A primary characteristic of objects that are even mildly curved is that the main flow separates from the surface when the Reynolds number exceeds a given value. For non-streamlined objects of reasonable size, the velocity required for this separation to take place may be small. However, the separation point is not stationary, but oscillates around an average location. The lateral pendulation of the separation zone is associated with the generation of a vortex and eddy shedding alternately on either side of the center line of flow. The eddies detach from the object and are convected downstream with the flow. Such a vortex trail in the wake region is referred to as a Karman Vortex Street. On detachment of the vortex, a circulation is induced about the object in close accordance with a basic hydrodynamic principle, according to which the circulation around a closed curve within a fluid must remain constant with time. This circulation modifies the pressure distribution about the object for a short period of time, resulting in an imbalance of pressure over the object and a side thrust of short duration. The net result is an oscillating side thrust on the cylinder, in a direction away from the last vortex, as shown in FIG. 1.

Under certain conditions the generation and shedding of vortices may be periodic, and the frequency of force reversal or the vibrational frequency of the object is the same or almost the same as the shedding frequency f. This frequency can be expressed in terms of the Strouhal number, defined as:

$$N_s = \frac{fD}{V_o}$$

where:
f is the frequency of vortex shedding:
D is a characteristic dimension of the object; and
$V_o$ is fluid velocity relative to the object.

The relation between the Strouhal number and the Reynolds number is well known and in the range of Reynolds number from $4 \times 10^2 \leq R_e \leq 10^5$, the Strouhal number $N_s$ can be accepted as a constant, whose value can be anything between 0.19 and 0.21, without appreciable error. Periodic vortex shedding initiates at $R_e \cong 44$ with $N_s = 0.12$. The Strouhal number reaches a value of 0.2 at $R_e = 1000$ and maintains this value until the vortex shedding phenomenon disappears in the "completely turbulent" ($R_e \geq 10^6$) flow regime.

This empirical constant ($N_s = 0.2$) makes the above evaluation useful in developing a current meter. Therefore, within the range $4 \times 10^2 \leq R_e \leq 10^5$, there is a linear relationship between the fluid velocity and the vibrational frequency due to eddy shedding.

The magnitude of the oscillating Strouhal force per unit length may be shown to be given by the approximate relationship:

$$F_s = \frac{1.7 \rho V_o^2 D}{2} = 0.85 \rho V_o^2 D$$

Where: $\rho$ is the mass density of the fluid.

Similarly, the drag force is given by the following equation:

$$F_D = \delta \frac{\rho V_o^2}{2} A$$

where A is the area of projection of the body upon a plane perpendicular to the flow and $\beta$ is the drag coefficient.

The natural frequency of the probe must be separated from the vortex shedding band so that the actual signal is not masked by the ringing of the probe at its natural frequency due to impulsing from turbulence. Since the lowest shedding frequency at the lowest velocity of interest is generally low, it is difficult to design for the natural frequency to be lower than the lowest shedding frequency. Therefore, it is more desirable for the natural frequency to be higher than the highest shedding frequency.

The natural frequency of a mechanical system is given by the following relationship:

$$f_n = \frac{1}{2}\pi \sqrt{\frac{K}{M}}$$

Where: K is the stiffness or the spring constant; and M is the effective mass.

The probe may be a cantilever where the stiffness is then given by the following relationship:

$$K = \frac{3EI}{l^3}$$

Where:
E is the modulus of elasticity;
I the moment of inertia; and
l the length of the probe.

The natural frequency can be raised either by lowering the effective mass or by increasing the spring constant. The spring constant may be increased by increasing the moment of inertia or by decreasing the length. However, decreasing the length reduces the sensitivity of the probe and high sensitivity is desired to detect the signal at very low flow speeds, at which the oscillatory force is very small. The probe cannot be made too long because it will lower the spring constant and thereby lower the natural frequency.

PREFERRED EMBODIMENT

Figure 2:
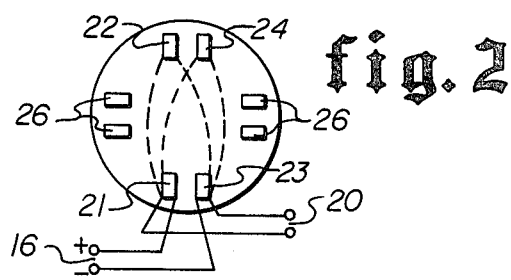
FIG. 2 illustrates a strain gauge arrangement on a cylindrical probe.

Referring now to FIG. 2, there may be seen an arrangement of detectors selected to provide an output irrespective of the direction of current flow. Generally, the detectors would be oriented perpendicular to an axis of symmetry. Where a cylindrical element is provided, two sets of detectors may be provided in quadrature to obtain omni-directional flow measuring capabilities. In a preferred embodiment, the detectors may take the form of strain gauges 21, 22, 23 and 24 interconnected to form a bridge. A power supply 16 energizes the strain gauge detectors. An output signal 20 is taken from the bridge whereby a bridge imbalance produces an output signal.

A strain gauge is sensitive to the direction of the strain whereby a single strain gauge bridge cannot produce a signal if the force component is perpendicular to the bridge-forming elements. This would occur where the fluid flow has its major velocity components substantially parallel to strain gauges 21, 22, 23 and 24. To overcome this problem, strain gauges 26 are provided to obtain a strain gauge bridge, as hereinabove discussed, in quadrature with a first strain gauge bridge. Thus, an output is obtained from at least one of the strain gauge bridges irrespective of current flow whereby the vortex shedding frequency can be recovered and the desired velocity information derived. It should be noted that the information sought to be recovered is contained in the frequency output, and the strain gauge bridge having the highest amplitude signal can always be used to obtain the most reliable information.

Figure 3:
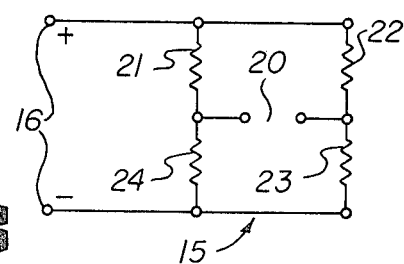
FIG. 3 is a schematic of a typical strain gauge bridge.

Referring now to FIG. 3, there may be seen a schematic of a single strain gauge bridge, as hereinabove discussed for FIG. 2. Strain gauge elements 21, 22, 23, and 24 form the component elements of the bridge. Bridge 15 is energized by power supply 16 so that output 20 is zero at the null, or quiescent, condition. A variety of strain gauges are available. For improved sensitivity, semi-conductor strain gauges may be used, which strain gauges have on the order of sixty times the sensitivity of conventional wire or foil gauges. As hereinabove discussed in the "Theory" section, the strain gauges must withstand both drag-induced strain and vortex shedding-induced strain. The probe element may generally be designed, however, so that the stress forces in the probe element are well below the limits of conventional strain gauges.

Figure 4:
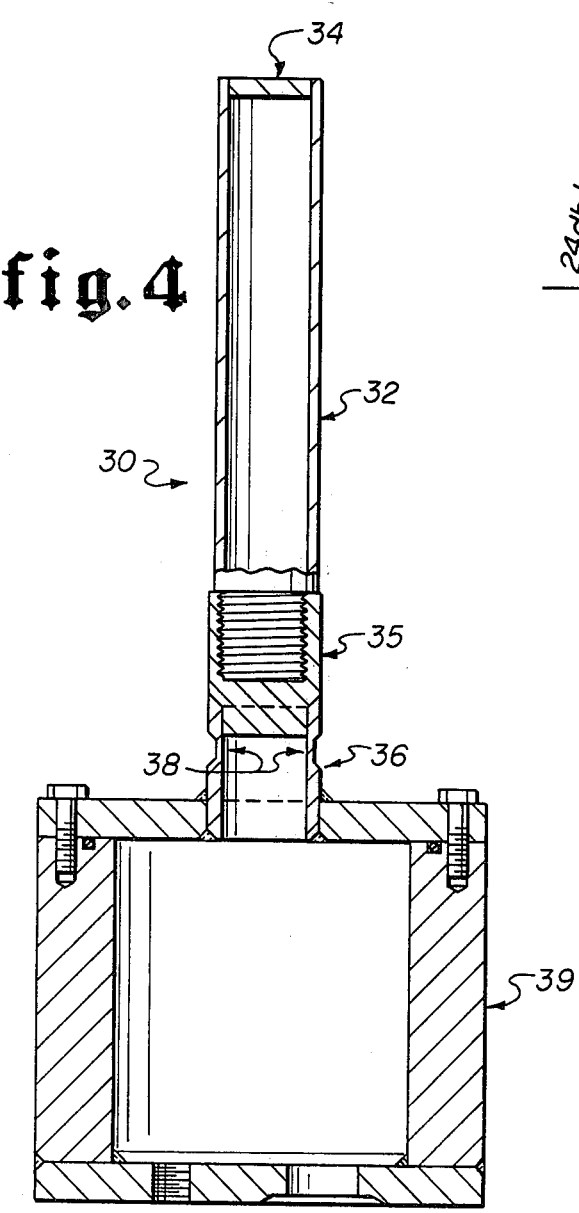
FIG. 4 is a cross-sectional elevation of one embodiment according to the present invention.

In FIG. 4 there may be seen a cross-sectional elevational view of an elongated element to be used as a probe in the present invention. Probe element 30 may conveniently be cylindrical where omni-directional flow measurement is desired. As noted in the prior art, however, a cylindrical shape is not the best vortex shedder and other cross-sections may be used where a substantially uni-directional flow is to be measured. In particular, probe element 30 could be square or rectangular, or any other cross-section which produces vortex shedding and which has at least one axis of symmetry which can be oriented generally parallel to the current flow. Although a preferred embodiment is cylindrical for an application hereinbelow discussed, it is not intended to so limit the present invention.

A complete flow meter and probe assembly 30 has been designed for use in measuring ocean currents, where the omni-directional flow measuring capabilities of a cylindrical element are highly desirable. It may be shown that a one inch diameter probe will produce a linear output over a fluid velocity range of about 0.07 feet per second (ft/sec) to 16.8 ft/sec, i.e. within the range of Reynold's numbers for sea water wherein the Strouhal number is essentially constant.

Using a one inch diameter probe as the example for probe element 32, and assuming that the velocity range of interest for oceanic applications is from 0.25 ft/sec to 10 ft/sec, it may be shown that the vortex shedding frequency band ranges from about 0.5 Hz to 25 Hz. This frequency band effects the probe design since the natural frequency of the probe must be separated from the vortex shedding frequency band so that the actual signal is not masked by the ringing of the probe at its natural frequency due to impulsing from turbulent flow.

Probe element 32 is cantilevered from housing 39 and may be analyzed according to the relationships hereinabove discussed in the "Theory". A hollow cylinder for probe element 32 increases the moment of inertia of probe 12 and increases the natural frequency without producing the corresponding reduction in sensitivity which would occur if the spring constant were increased by decreasing the length of probe element 32. The moment of inertia and the probe length may be varied for any given application to obtain an optimum relationship for that application.

Probe element 32 is sealed with top plug 34 and bottom plug 35 interconnects with housing 39 through a strain gauge mounting portion 36. Strain gauges may be mounted at various locations 38 in the interior of mounting portion 36 and not exposed to sea water and direct flow induced forces. In practice, the housing may be filled with an oil for mounting and protecting any electronics placed within the housing 39. The design of housing 39 will be determined by the particular application to mate with adjoining structure. A variety of materials may be used to form probe element 32, including steel and copper nickel, wherein the desired natural frequency is maintained. For oceanic application, copper nickel is a desired substance because of its corrosion resistance and resistance to chloride stress corrosion failure.

It will be noted that it is desirable to locate strain gauges 21-24 and 26, as hereinbefore noted, adjacent the fixed end of element 32 where strains produced by element 32 in response to shedding vortices may be sensed. From the preferred embodiment of a portion of the present invention illustrated in FIG. 4, it may be seen that several possible mounting surfaces 38 may provide such locations, whereby strain gauges 21-24 and 26 may be oriented so as to measure said strains. While locations 38 interior the mounting portion 36 have been discussed and illustrated for this purpose, it will be appreciated that, for example, surfaces of housing 39 adjacent probe element 36 may also experience strain from deflections of element 32, and accordingly, may also be suited to this purpose. However, in the preferred embodiment shown, FIG. 2 illustrates the spacial relationship of two full strain gauge bridges, the elements of each bridge being arranged in quadrature with respect to one another, and FIG. 4 illustrates that these strain gauges 21-24 and 26 may be preferably arranged on inner surfaces 38 of mounting portion 36 in the plane of the paper and in a plane perpendicular to the plane of the paper, and, are accordingly mounted on one mounting portion 36.

Figure 5:
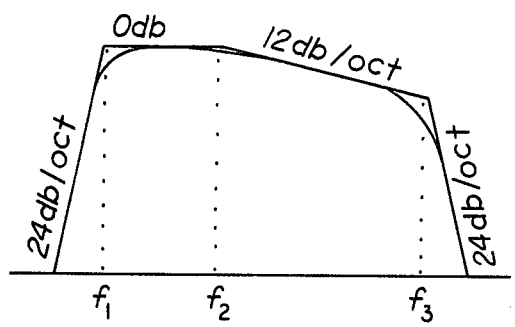
FIG. 5 is a graph of a signal filter bandpass characteristics.

The output signals from the strain gauge bridges must now be processed to obtain a final output signal functionally related to the fluid velocity. As hereinabove indicated, the frequency of the output signal contains the desired information and the frequency signal is first processed to eliminate interfering signals. FIG. 5 depicts the response characteristics of a typical signal network which may process the strain gauge bridge output signal. The frequency band width of interest lies between $f_1$ and $f_3$, which correspond to the lowest and highest shedding frequencies expected, respectively. The filter is also designed to provide a substantially constant amplitude output signal over the frequency range of interest. The oscillatory force may be shown to be proportional to the square of the shedding frequency so that the amplitude of the bridge output increases at a rate of 12 decibels per octave (db/octave). The filter is designed to compensate by attenuating the input at a rate of 12 db/octave.

Thus, as shown in FIG. 5, $f_1$ represents the low frequency cutoff point which attenuates any frequency below $f_1$ at 24 db/octave. At low frequencies, between $f_1$ and $f_2$, the oscillatory force is weak and a flat response characteristic is maintained over that range. Typically, $f_2$ may occur at about 6 Hz. Above $f_2$, it is desired to attenuate the inherently increasing signal amplitude, and an attenuation of 12 db/octave is incorporated to compensate for this inherent increase. A high frequency cutoff occurs at $f_3$ whereby any signals above $f_3$ are attenuated at 24 db/octave. A filter network having these characteristics may be readily designed using techniques well known in the art.

Figure 6:
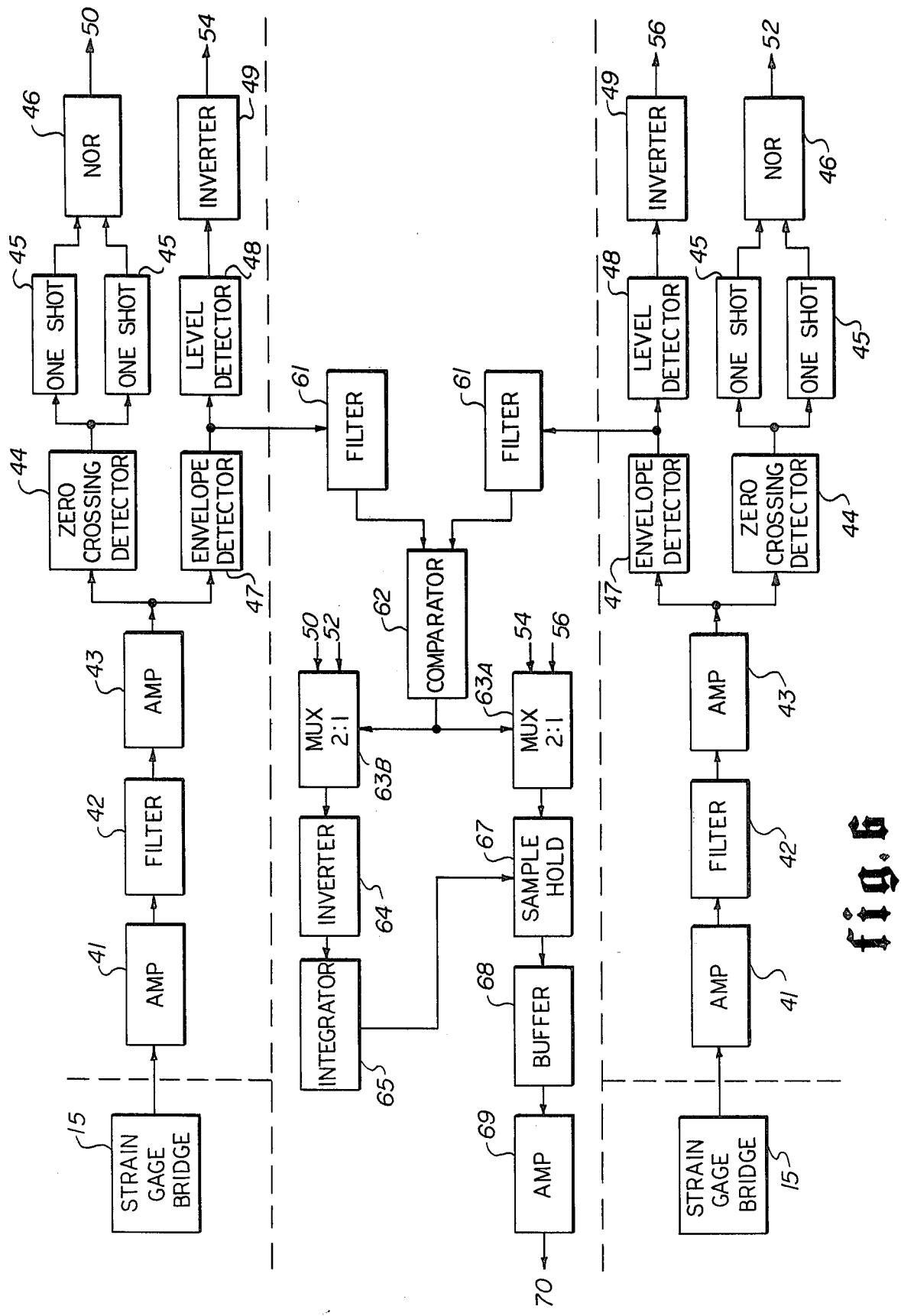
FIG. 6 is a block diagram schematic of a signal processing circuit.

Referring now to FIG. 6, there may be seen a schematic in block diagram form of signal processing circuitry for obtaining a final output functionally related to fluid velocity. For omni-directional flow measurements using a cylindrical probe, two strain gauge bridges 15 are used to obtain signals carrying the desired frequency information, the amplitude of each of the bridge output signals being dependent upon the direction of the fluid velocity. The output from strain gauge bridge 15 may be increased by amplifier 41 and passed through filter 42. The characteristics of filter 42 are as generally discussed hereinabove and depicted in FIG. 5. The output from filter 42 is generally a variable frequency output whose amplitude is substantially frequency independent.

Filter 42 output is then increased by amplifier 43 and presented to a zero crossing detector 44 and an envelope detector 47. The zero crossing detector circuit may be provided by an amplifier and clipping circuit wherein any amplitude modulations are removed from the signal. Thus, a heavily saturating amplifier may be provided whose output is clipped by diode circuitry. The output from zero crossing detector 44 is provided to two one-shot multi-vibrators 45 whose outputs feed to NOR Gate 46. The pulse width of each one-shot multi-vibrator 45 is adjusted to be somewhat less than the pulse width associated with the highest expected frequency so that an output from NOR Gate 46 is obtained between multi-vibrator 45 outputs. An output signal 50 is obtained from NOR Gate 46 with a frequency twice the Strouhal frequency. Thus, output signal 50 has a frequency rate proportional to the fluid velocity. A second output signal 52 is obtained from identical circuitry processing information from a second strain gauge bridge.

Outputs 50 and 52 are presented to a two-channel multiplexer 63B which selects one of the inputs for further processing. The input selection is determined by the relative stength of the Strouhal signals and this information is first developed by the output of envelope detector 47. Envelope detector 47 may simply comprise a rectifyer-type circuit whose output is generally related to the amplitude of the Strouhal signal. The output from envelope detector 47 is presented to level detector 48 and to a low pass filter 61 to produce an output proportional to the individual signal envelope. Such an output signal is developed for each strain gauge bridge channel and presented to a comparator 62, whose output is used to control the multiplex circuits, as hereinbelow described.

The amplitude of the Strouhal signal may also be used to develop a control signal for the sample and hold circuitry. The output from envelope detector 47 is then presented to level detector 48. This signal amplitude is compared with a predetermined signal strength and the output is inverted by inverter 49, whereby signal 54 is available as a sample and hold control signal. Signal 56 is derived from the other strain gauge bridge circuitry and signals 54 and 56 are presented to a second multiplex unit 63.

Thus, the output from comparator 62 instructs the multiplex units 63A and 63B to pass an input from the strain gauge bridge channel having the largest amplitude. Signal 50 or 52 is then presented to an inverter 64 and thence to integrator 65 which produces an analog output functionally related to the fluid velocity. This analog output is presented to sample and hold circuit 67. The sample and hold control signal 54 or 56 corresponding to the selected channel is also presented to sample and hold circuits 67.

Sample and hold circuit 67 is included to account for conditions of signal "drop-out" produced by fluid turbulence about the probe element. Such turbulence can cause momentary pressure conditions counteracting the vortex shedding forces wherein signal loss is experienced.

When this signal loss occurs, which may conveniently be detected by a suitable combination of level detector 48 and inverter 49 for each channel, a hold circuit thus derived and present on output 54 or 56 is delivered through multiplexer 63A to sample and hold amplifier 67. This signal commands sample and hold amplifier 67 to store the output it attained in response to the integrator 65 output prior to the loss of output from integrator 65 during vortex shedding signal dropout. As the vortex shedding signal reappears, also detected by level detector 48 and inverter 49, a sample signal present on output 54 or 56 in like manner commands sample and hold amplifier 67 to resume tracking the information present at integrator 65 output. signal is presented to sample and hold circuit 67 which maintains the last output until the hold signal is removed. In measuring flow currents in large bodies of water, it is expected that such a "drop-out" condition will only momentarily exist, such that it is reasonable to maintain the last flow signal until the turbulence condition disappears. A suitable sample and hold circuit is represented by module LH0023C available from National Semiconductor. The output from sample and hold circuits 67 is then presented to output circuitry which may include a buffer 68 and amplifier 69 for presentation on a selected output monitor. It is believed that the above description would enable one skilled in the art to construct a suitable signal processing circuit. A complete circuit is contained in a thesis by Lohit Datta-Barua entitled "An Oceanographic Instrumentation System," publically available in 1978.

A particular application for which the present invention is uniquely suitable is the measurement of ocean currents. A cylindrical probe (see FIG. 4) may be used, and two strain gauge bridges may be mounted in quadrature (see FIG. 2). The sensitivity desired for measuring the relatively low velocity ocean currents may be obtained by using an elongated probe and adjusting the natural frequency by increasing the moment of inertia. With a cylindrical probe, increasing the moment of inertia is conveniently done by providing a hollow cylinder.

The unitary probe element is able to withstand large pressure forces since all of the measuring apparatus may be contained within the probe 34 and housing 36 and 39 structure (see FIG. 1). No external accessory equipment or protuberances extend into the surrounding ocean to be subject to damage by turbulence or depth forces.

Finally, the unique omni-directional sensing capability does not require orienting the velocity measuring probe in any particular direction. The strongest input signal may be automatically selected for a reliable and continuous output, regardless of directional fluctuations.

It is therefore apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A method for measuring the rate of flow of a fluid stream, comprising the steps of:
    introducing an elongated element fixed only at one end and having at least one axis of symmetry in a first fluid stream to produce vortices shedding alternately from first and second locations on said element whereby first periodic forces are produced on said element;
    measuring the response of said element at said fixed end to said first forces;
    subjecting said element to a second fluid stream differing in direction from said first fluid stream to produce vortices shedding from third and fourth locations on said element different from said first and second locations whereby second periodic forces are produced on said element; and
    measuring the response of said element at said fixed end to said second forces.

2. The method according to claim 1, wherein measuring the response of said element includes:
    detecting strain forces in said element about said at least one axis of symmetry;
    generating a first electrical signal functionally related to said strain forces; and
    deriving from said first signal a second signal functionally related to said rate of flow of said fluid stream.

3. A method for measuring the rate of flow of a fluid, comprising the steps of:
    introducing a cylindrical element having a longitudinal axis into a moving fluid to produce vortices shedding from the surface of said cylindrical element whereby periodic forces act on said cylindrical element; and
    detecting directly on the surface of said cylindrical element the strains produced at a plurality of locations on said surface from said periodic forces, said plurality of locations including a first and second said locations falling on a line intersecting said axis and at least a third said location on said surface different from said first and second locations.

4. The method according to claim 3, further including the steps of:
    generating a plurality of first electrical signals corresponding to said strains at said plurality of locations;
    deriving from at least one of said plurality of first signals a second signal functionally related to said rate of flow of said fluid.

5. A vortex shedding flow meter, comprising:
    an elongated element symmetrical about at least one cross-sectional axis and fixed at only one end for extending into a fluid stream to obtain shedding vortices at a rate generally proportional to the velocity of said fluid stream, said element being directly responsive to forces exerted on said element by said shedding vortices;
    output means mounted directly on said elongated element adjacent one end of said element for producing a first signal functionally related to the response to said element to said shedding vortices;
    electronic circuit means interconnected with said output means for providing a second signal functionally related to said velocity of said fluid stream;
    detector means for detecting a signal loss from said output means; and
    storage means for maintaining said second signal when said signal loss is detected.

6. The flow meter of claim 5 wherein said output means comprises strain gauge means.

7. An omni-directional vortex shedding flow meter, comprising:
    an elongated cylinder for immersing in a fluid stream;
    a plurality of strain gauges mounted on said cylinder adjacent one end of said cylinder for detecting the response of said cylinder to vortices shedding from the surface of said cylinder;
    electronic circuit means interconnected with said plurality of strain gauges for providing an output indication functionally related to the velocity of said fluid stream, said circuit means having means for detecting a signal loss from said strain gauges and means for maintaining said output indication when said signal loss is detected.

8. The flow meter of claim 7 wherein said elongated cylinder has a natural frequency greater than the highest expected shedding rate of said vortices for reducing response of said element to turbulent flow;
    a plurality of strain gauges mounted on said cylinder adjacent one end of said cylinder for detecting the response of said cylinder to vortices shedding from the surface of said cylinder;
    electronic circuit means interconnected with said plurality of strain gauges for providing an output indication functionally related to the velocity of said fluid stream, said circuit means having means for detecting a signal loss from said strain gauges and means for maintaining said output indication when said signal loss is detected.

9. A method for measuring the rate of flow of a fluid stream, comprising the steps of:

introducing an elongated element fixed only at one end and having at least one axis of symmetry in a fluid stream to produce vortices shedding from alternate sides of said at least one axis whereby periodic forces are produced on said element;

measuring the response of said element at said fixed end to said forces;

detecting from said measurement strain forces in said element about said at least one axis of symmetry;

generating a first electrical signal functionally related to said strain forces;

deriving from said first signal a second signal functionally related to said rate of flow of said fluid stream;

detecting a signal loss condition of said first signal; and holding said second signal during said signal loss condition at a level determined prior to said signal loss condition.

10. A method for measuring the rate of flow of a fluid, comprising the steps of:

introducing a cylindrical element into a moving fluid to produce a vortices shedding from the surface of said cylindrical element whereby periodic forces act on said cylindrical element;

detecting the strains produced at a plurality of locations on said cylindrical element from said periodic forces;

generating a plurality of first electrical signals corresponding to said strains at said plurality of locations;

deriving from at least one of said plurality of first signals a second signal functionally related to said rate of flow of said fluid;

detecting a signal loss condition of said plurality of first signals; and holding said second signal at a level determined prior to said signal loss condition until the resumption of at least one of said plurality of first signals.

11. A vortex shedding flowmeter comprising:

an elongated element means radially symmetrical along at least one cross-sectional axis and fixed at only one end for extending into a fluid stream to obtain shedding vortices at a rate generally proportional to the velocity of said fluid stream, said element means being directly responsive to forces exerted on said element means by said shedding vortices, and strain gauge means carried by at least one wall of said element means comprising a first plurality of strain gauges defining a first plane with said cross-sectional axis, and a second plurality of strain gauges defining at least one second plane with said cross-sectional axis different from said first plane.

12. Apparatus according to claim 11, wherein said elongated element means is a cylinder means.

13. Apparatus according to claim 11 or 12, wherein said first plane and said at least one second plane are perpendicular to each other.

14. Apparatus according to claim 13, wherein said first and second plurality of strain gauges are in a third plane perpendicular to said cross-sectional axis.

15. Apparatus according to claim 14, wherein said first and second plurality of strain gauges each is comprised of a first and second pair of strain gauge transducers disposed in diametrically opposed relation to each other.

16. A vortex shedding flow meter, comprising:

an elongated element means radially symmetrical along at least one cross-sectional axis and fixed at only one end for extending into a fluid stream to obtain shedding vortices at a rate generally proportional to the velocity of said fluid stream;

said element means being directly responsive to forces exerted on said element by said shedding vortices; and output means carried by the wall of said elongated element means at more than two locations on said wall for producing a first signal functionally related to the response of said element means to said shedding vortices, said output means including strain gauge means mounted on said element means comprising four pairs of strain gauges, each said pair being mounted on a different one of four sections of said element means defined by two perpendicular planes intersecting along said axis of said element means.

17. Apparatus according to claim 16, wherein said strain gauge means comprises a first strain gauge bridge means comprised of a first and second pair of strain gauges mounted in a first opposed relationship generally perpendicular to said axis of symmetry and a second strain gauge bridge means comprised of a third and fourth pair of strain gauges mounted in a second opposed relationship generally perpendicular to said axis of symmetry and different from said first opposed relationship.

18. Apparatus according to claim 16 or claim 17 wherein said element is an elongated cylinder means for generating said forces having magnitude independent of direction of said fluid stream flowing substantially perpendicular to said axis.

* * * * *